Feb. 20, 1962 W. K. WASDELL 3,021,926
SHOCK ABSORBERS OR VIBRATION DAMPERS
Filed Jan. 14, 1958
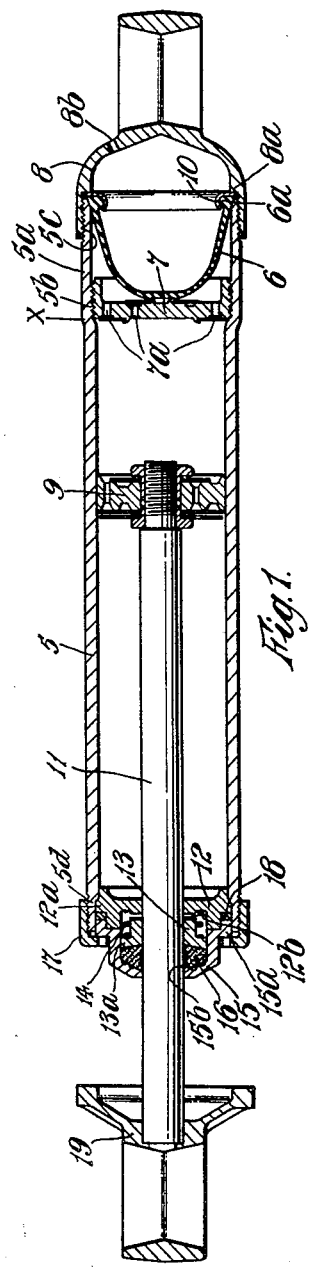
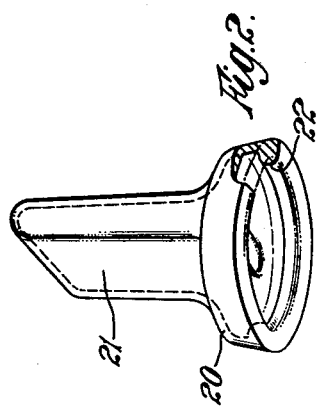
INVENTOR
WILLIAM KENNETH WASDELL
Norris & Bateman
ATTORNEYS United States Patent Office 3,021,926
Patented Feb. 20, 1962

3,021,926
SHOCK ABSORBERS OR VIBRATION DAMPERS
William Kenneth Wasdell, "Highbury," Barker Road,
Sutton Coldfield, Warwickshire, England
Filed Jan. 14, 1958, Ser. No. 708,921
Claims priority, application Great Britain Feb. 6, 1957
3 Claims. (Cl. 188—88)

This invention has reference to improvements relating to shock absorbers or vibration dampers, hereinafter simply referred to as shock absorbers, of the kind commonly known as direct acting or telescopic shock absorbers, and which incorporate a cylindrical body which affords a chamber, hereinafter referred to as the working chamber, for the reception of a liquid damping medium, said chamber accommodating a piston which is adapted for a linear reciprocable motion therein and which is furnished with valve controlled apertures to permit the controlled passage through the piston of the liquid damping medium when the piston is making its inward and outward strokes in the working chamber in the performance of the shock absorbing function of the device when the piston rod carrying the piston and the body of the damper are connected between parts subjected to relative movement.

In order that shock absorbers of the kind aforesaid shall operate with the maximum of efficiency it is requisite that the space in the working chamber shall at all times be kept completely filled with the liquid damping medium to the exclusion of free air, while on the other hand some provision must be made for any alteration in the volume of the damping medium in the working cylinder due to temperature changes, for compensating for the variable displacement of the damping medium in the cylinder by the inward and outward movement of the rod which carries the piston, and for effecting the operation, technically termed recuperation, which ensures the outward motions of the piston in the functioning of the device.

A shock absorber or vibration damper of the aforesaid character is disclosed in the complete specification of British Letters Patent No. 726,898.

Various means have heretofore been proposed for effecting the aforesaid compensations in direct acting telescopic dampers and in the case of dampers of the single cylinder type, with which type the present invention is concerned, it has heretofore been proposed to provide on the end of the working chamber remote from the end thereof through which the piston rod enters into the said chamber, a separate tubular extension designed to afford a cavity for the location therein of a flexible air container which is adapted to undergo such deformation on the inward stroke of the piston in the chamber as will permit the entry into the cavity in the extension of a volume of damping medium equivalent to the displacement of the piston rod, the displaced medium being returned to the working chamber on the ensuing outward stroke of the piston as is well understood.

In a known construction of the extension provided for the purpose aforesaid on the working chamber, the said extension has been made by a die-casting operation to provide a short cylindrical tubular body provided interiorly adjacent the end thereof which is attached to the working chamber, with an integrally formed transversely disposed perforated diaphragm, this end of the extension being furnished with an integral internally screw threaded annulus to admit of the extension to be secured to an external screw thread on the steel working chamber, the other end of the extension being furnished with an external screw threaded annular portion for the attachment thereto of a member which closes the end of the extension component and also closes the end of a flexible cup-like member located in the cavity provided by the extension and with which flexible member the closure member co-acts to constitute the air container for association with the working chamber for the purpose aforesaid.

This known construction of the extension component is attended with the serious defect that owing to the difference between the co-efficients of expansion of the steel working chamber and the die-cast extension component the joint between the two components, especially at high temperatures which may be developed by the damper, will be impaired so as to result in leakage of the damping medium in the operation of the device. The present invention has for its primary object to overcome this defect.

The present invention consists of a single cylinder shock absorber comprising a working chamber accommodating a valved piston carried by a piston rod extending from one end of the working chamber through means for closing that end of the chamber, characterised in that the opposite end of the working chamber to that through which the piston rod extends, is expanded in diameter to form an integral recuperation chamber which is divided from the working chamber by a diaphragm plate incorporating control valves, the recuperation chamber being closed by a cap adapted to co-act with the said recuperation chamber to clamp in position in the recuperation chamber a flexible cup-like component for effecting the compensation and recuperation functions.

Convenient means for carrying the present invention into practice will now be described with reference to the accompanying drawings wherein:

FIGURE 1 is a cross section on the major axis of a shock absorber in accordance with this invention, and FIGURE 2 is a perspective view of a modified form of flexible cup for use in conjunction with a device having a somewhat smaller diameter but otherwise similar to the device seen in FIGURE 1.

Referring to FIGURE 1 of the drawings it will be seen that I dispense with the provision of the separately formed recuperation chamber ordinarily provided as aforesaid on one end of the working chamber, and I form the recuperation chamber as an integral part 5a of the main cylindrical steel body 5 of the damper by extending the length of the body to any desired extent and expanding at X the diameter of the extension 5a so as to give it such dimensions as will permit the arrangement therein of the flexible cup-like component 6 for enclosing air for recuperation and compensation purpose as aforesaid. The transversely disposed diaphragm plate which is customarily associated with the cylinder and which is furnished with valve controlled inlet and outlet apertures 7a, which part has heretofore been formed as an integral part of a separately formed extension on the damping cylinder, is peripherally screw threaded for engagement with the tapped inner end 5b of the internal periphery of the recuperation chamber adjoining its junction at X with the end of the working chamber 5. The diaphragm plate 7 is made from steel or sintered iron having substantially the same co-efficient expansion as the steel body 5 of the damper.

The outer end of the recuperation chamber 5a is furnished with an external screw thread 5c for the attachment thereto of a closure cap member 8 which is adapted for connection to a part of the chassis of the vehicle or other structure by the provision of an integral eye in known manner.

It will be appreciated that a damper having an integral recuperation chamber constructed as aforesaid will not suffer from leakage due to the differential expansion of dis-similar metals.

In a known construction of dampers of the type to which this invention is directed, the flexible, say rubber, cup-like component for containing the air for the purpose aforesaid, has had the formation of a cylindrical tube of appropriate diameter for fitting in the recuperation chamber, the cylindrical tube being closed at its inner end in a part which is substantially flat. This known construction of flexible cup is attended with the disadvantage that when the cup is subjected to pressure when the piston 9 in the working chamber is making its inward stroke, the said component is liable to undergo such deformation that a part thereof becomes trapped in the bore of the recuperation chamber, usually after the cup has folded somewhat within itself, with the result that its proper functioning is impaired, and there is also the possibility that it may be ruptured.

A further improvement comprised in the present invention has for its object to avoid this disadvantage in the known cup-like component by providing the component with a conoidal formation which is blended into an upper part of spherical contour as seen in FIGURE 1. The wall of the said component is of tapering thickness from its outer open end to its inner closed end as seen in FIGURE 1 and the said open end is formed with an inwardly directed annular bead 6a which is adapted for engagement in the outwardly opening channel-like part of a metal ring 10 which, when the flexible component 6 is properly assembled in the cavity in the recuperation chamber 5a of the cylinder, is supported on an internal shoulder 8a of the member 8 provided for closing the end of the recuperation chamber so that when the said closure member 8 is screwed on to the external thread 5c provided about the outer end of the recuperation chamber, an oil-tight condition is maintained between the ring 10 and the closure member 8.

The closure member 8 is provided with a vent 8b for ensuring the maintenance of atmospheric pressure on the concave side of the flexible cup 6.

In the assembly of the component parts of the damper seen in FIGURE 1 the piston rod 11 is extended to locate the piston 9 adjacent to the opposite end of the working chamber to that adjoining the recuperation chamber. The damper is filled with the damping medium and the flexible cup is inserted to displace excess damping medium. The closure member 8 is then screwed on to the recuperation chamber to close this chamber and to clamp the flexible cup in position so that when the piston is returned to its normal operative position the cup is somewhat compressed and by virtue of its capacity for further deformation will serve to compensate for temperature and volume displacement changes which are present in the damper operation.

In carrying the invention into practice it may be necessary in certain cases to provide a damper having a cylindrical body of somewhat smaller diameter than that which is seen in FIGURE 1 without increase in the overall length of the damper. Such a construction gives rise to the problem of providing a flexible component for defining an air cavity, having a sufficiently large capacity for the compensation of the temperature effects and the variable piston rod displacement, which component must work reliably within the diminished diameter of the integral recuperation chamber 5a of the cylinder. This problem is overcome by the employment of a flexible cup-like component having the natural shape seen in FIGURE 2 of the drawings wherein it will be seen that the short cylindrical open ended part 20 blends into a generally rectangular hollow blade-like part 21 having relatively wide and narrow proportions in mutually perpendicular axial planes. The rim about the open end of the component is formed with an annular bead 22 for attachment to a channelled ring in a similar manner to that previously described.

In the assembly of a damper employing the flexible component seen in FIGURE 2, the piston 9 is displaced to its fullest extent towards the diaphragm plate 7 and the damper is filled with the damping medium. The flexible component is then introduced into the open end of the recuperation chamber to close the chamber and secure the flexible component in position within the chamber. When the piston is displaced outwardly into its normal operative position it will be appreciated that the blade-like part 21 of the cup will be expanded from its natural form into a somewhat cylindrical shape whilst the resultant substantial change in volume of this part of the component will be accompanied by relatively little strain due to the natural shape thereof. It will be seen that the difference in volume between the expanded condition of the cup and its natural shape will compensate for the variations in the displacement of the piston rod 11 whereas the permitted contraction in volume of the component below its natural volume will compensate for temperature changes present in the damper.

A further improvement comprised in this invention resides in the means provided for sealing the damper against leakage at the end of the working chamber through which the piston rod 11 passes thereinto.

The sealing means provided in accordance with the present invention comprises a member 12, hereinafter referred to as the rod guide, the said rod guide being constituted by a block or disc having an axial bore therein of appropriate diameter for permitting the piston rod 11 to fit and slide through the block.

The rod guide 12 is formed intermediate its respective faces with a peripheral flange-like part 12a of a diameter proper for taking and fitting in a counter-bored portion 5d at this end of the working chamber.

The shoulder formed at the junction of the said counter-bore and the main part of the bore in the cylinder provides an abutment whereby the rod guide is properly located in the bore of the cylinder.

The inner or lower face of the rod guide 12 is formed with a part of a diameter proper for fitting in the adjoining part of the main bore of the cylinder and the upper or outer face is furnished with a circular recess 12b to accommodate a portion of a flanged member 13, hereinafter termed the seal supporting ring, and a coil spring 14 one end of which bears on the bottom of the recess 12b and its other end on the inner side of the flange 13a on the seal supporting ring 13.

The bore in the said seal supporting ring 13 has a diameter proper for a sliding fit of the ring on the piston rod 11, and the diameter of the flange 13a on the ring is such that it fits and slides in a cylindrical portion of a member 15, hereinafter termed the gland plate, designed to coact with the seal supporting ring to provide a cavity wherein the seal proper 16, which as usual is made of a suitable oil resisting rubber, is located.

The gland plate 15 has a central hole therein which permits the piston rod 11 to pass therethrough and the inner end of the tubular portion of the said plate is formed with a flange 15a of appropriate diameter for fitting in the counter-bore aforesaid in the end of the cylindrical body of the damper.

The inner end of the said tubular part on the gland plate 15 is formed with an annular recess for the location therein of a portion of the wall of the circular recess on the upper face of the rod guide 12, the recessed end of the gland plate taking a seating on the rim of the annular recess on the rod guide, and a resilient packing ring 18 is interposed between the presented surfaces of the rod guide and the gland plate.

The components of the sealing means described are retained in their properly assembled conditions by a cap 17 which is adapted for a screw connection with a screw thread on this sealed end of the cylindrical body 5 of the damper. Conveniently the external face of the gland plate 15 is tapered towards the piston rod 11 to admit of the disposition of the mounting means 19 on the end of the piston rod for connection with the chassis of a vehicle, as close as is possible to the end of the cylinder to provide a damper of minimum length.

In order to minimise damage to the lips of the bore in the rubber seal 16, in the event of excessive pressure building up underneath the seal supporting ring 13, small spaces 15b, preferably in the form of circular channels or grooves may be provided on the inner face of the end wall of the gland plate 15.

The said spaces 15b are obviously full of air when the damper is first assembled, and as the seal 16 is compressed into them the air acts as a spring to return the seal to its normal condition when the excessive oil pressure returns to normal.

By means of this construction it is possible to provide a damper which will neither leak nor show cavitation even at the high temperatures caused by driving the vehicle at high speeds over very bad roads.

It will be appreciated that where it is desired to construct a non-serviceable type of damper the diaphragm plate 7 and/or the cap 8 may be welded, brazed or otherwise secured to the recuperation chamber without departing from the scope of this invention.

I claim:
1. In a shock absorber, a tubular body formed by a single length of metal tubing of uniform thickness and defining a longitudinally extending cylindrical piston working chamber, a valved piston mounted for reciprocation in said working chamber, a piston rod fixedly extending from said piston through one end of said working chamber and adapted to be connected to a part subjectable to shock, means for closing said one end of said working chamber about said piston rod, said tubular body forming an integral radially expanded tubular extension at the opposite end of said working chamber and providing a recuperation chamber of larger internal diameter than said piston working chamber and of sufficient volume for containing displaced damping fluid during piston action, said extension being formed with an outer annular end face, means separating said recuperation chamber from said piston working chamber including a transversely disposed diaphragm plate in rigid engagement with said tubular body at the juncture of said piston working chamber and said recuperation chamber, said diaphragm plate having damping fluid control valves for metering the displacement of damping fluid between said chambers, cap means formed with a skirt detachably secured to the exterior of said tubular extension and closing the end of said recuperation chamber opposite from said diaphragm plate, said cap means having an annular shoulder extending inwardly substantially in alignment with said annular end face, a cup retainer having an annular lip axially clamped between said shoulder and the end face of said tubular extension, said cup retainer being formed with an endless radially outwardly opening rigid peripheral channel extending into said extension radially inwardly of said lip, a self-supported domed resilient walled cup located wholly within said recuperation chamber, said cup being free of internal support and having a larger open end rim section disposed in the end of said recuperation chamber opposite from said diaphragm plate and having a smaller closed end disposed adjacent diaphragm plate, said end rim section being formed with a radially inwardly extending annular bead portion which is received in said peripheral channel with a fluid tight fit between said tubular extension and said cup retainer and which is substantially free of the axial clamping action exerted on said lip, and means adapted for anchoring said piston working chamber, said recuperation chamber and said cap means to a second part movable relative to said first part, said cup being surrounded in said recuperation chamber by damping fluid and being deformed by pressure of additional damping fluid displaced through said plate into the recuperation chamber as the piston moves toward said diaphragm plate and resiliently expanding to displace sufficient damping fluid back through said diaphragm plate to maintain said working chamber filled with said damping fluid as the piston moves away from said diaphragm plate.

2. In a shock absorber, a tubular body formed by a single length of metal tubing of uniform thickness and defining a longitudinally extending cylindrical piston working chamber, a valve piston mounted for reciprocation in said working chamber, a piston rod fixedly extending from said piston through one end of said working chamber and adapted to be connected to a part subjectable to shock, means for closing said one end of said working chamber about said piston rod, said tubular body forming an integral radially expanded tubular extension at the opposite end of said working chamber and providing a recuperation chamber of larger internal diameter than said piston working chamber and of sufficient volume for containing displaced damping fluid during piston action, said extension being formed with an outer annular end face, means separating said recuperation chamber from said piston working chamber including a transversely disposed diaphragm plate in rigid peripheral screw threaded engagement with said tubular body at the juncture of said piston working chamber and said recuperation chamber, said diaphragm plate having damping fluid control valves for metering the displacement of damping fluid between said chambers, cap means formed with a skirt detachably threadedly secured to the exterior of said tubular extension and closing the end of said recuperation chamber opposite from said diaphragm plate, said cap means having an annular shoulder extending inwardly substantially in alignment with said annular end face, a cup retainer having an annular lip axially clamped between said shoulder and the end face of said tubular extension, said cup retainer being formed with an endless radially outwardly opening peripheral channel extending into said extension radially inwardly of said lip, a self-supported domed resilient walled cup located wholly within said recuperation chamber, said cup being free of internal support and having a larger open end rim section disposed in the end of said recuperation chamber opposite from said diaphragm plate and having a smaller closed end disposed adjacent diaphragm plate, said end rim section being formed with a radially inwardly extending annular bead portion which is received in said peripheral channel with a fluid tight fit between said tubular extension and said cup retainer and which is substantially free of the axial clamping action exerted by said cap means, and means adapted for anchoring said piston working chamber, said recuperation chamber and said cap means to a second part movable relative to said first part, said cup being surrounded in said recuperation chamber by damping fluid and being deformed by pressure of additional damping fluid displaced through said plate into the recuperation chamber as the piston moves toward said diaphragm plate and resiliently expanding to displace sufficient damping fluid back through said diaphragm plate to maintain said working chamber filled with said damping fluid as the piston moves away from said diaphragm plate.

3. The shock absorber defined in claim 2 wherein said tubular extension is internally threaded axially from the juncture of said chamber toward said annular end face for mounting said diaphragm plate.

References Cited in the file of this patent
UNITED STATES PATENTS

| | | |
|---|---|---|
| 1,909,768 | Jones | May 16, 1933 |
| 2,314,404 | Katcher | Mar. 23, 1943 |
| 2,628,692 | Hufferd | Feb. 17, 1953 |

FOREIGN PATENTS

| | | |
|---|---|---|
| 523,726 | Belgium | Mar. 4, 1956 |
| 1,059,101 | France | Nov. 10, 1953 |
| 1,112,300 | France | Nov. 9, 1955 |